United States Patent
Kosik et al.

[11] Patent Number: 6,045,484
[45] Date of Patent: Apr. 4, 2000

[54] AUTOMATIC CLUTCH

[75] Inventors: Franz Kosik, Ostfildern; Thomas Grass, Urbach; Michael Salecker, Stuttgart, all of Germany

[73] Assignees: DaimlerChrysler AG, Stuttgart; LuK Getriebe-Systeme GmbH, Buehl, both of Germany

[21] Appl. No.: 09/269,275
[22] PCT Filed: Sep. 18, 1997
[86] PCT No.: PCT/DE97/02146
 § 371 Date: Mar. 25, 1999
 § 102(e) Date: Mar. 25, 1999
[87] PCT Pub. No.: WO98/13617
 PCT Pub. Date: Apr. 2, 1998

[30] Foreign Application Priority Data

Sep. 25, 1996 [DE] Germany .......................... 196 39 377

[51] Int. Cl.[7] .................................................. F16D 48/06
[52] U.S. Cl. .............................. 477/174; 477/176; 477/86
[58] Field of Search ................................... 477/166, 167, 477/174, 175, 178, 180, 74, 84, 86

[56] References Cited

U.S. PATENT DOCUMENTS

| | | |
|---|---|---|
| 4,509,625 | 4/1985 | Tellert ........................................ 477/86 |
| 4,653,621 | 3/1987 | Oshiage ................................... 477/174 |
| 4,805,750 | 2/1989 | Nitz . |
| 5,067,599 | 11/1991 | Roder et al. ............................. 477/176 |
| 5,176,234 | 1/1993 | Reik et al. ................................. 477/74 |
| 5,403,250 | 4/1995 | Juergens .................................. 477/176 |
| 5,725,456 | 3/1998 | Fischer et al. ........................... 477/174 |
| 5,743,829 | 4/1998 | Tanizawa et al. ....................... 477/174 |
| 5,782,710 | 7/1998 | Kosik et al. ......................... 477/175 X |
| 5,847,272 | 12/1998 | Schneider et al. ..................... 73/118.1 |
| 5,938,561 | 8/1999 | Schubert ............................. 477/174 X |

FOREIGN PATENT DOCUMENTS

| | | |
|---|---|---|
| 0 759 513 | 2/1997 | European Pat. Off. . |
| 41 00 372 | 7/1992 | Germany . |
| 195 30 610 | 2/1997 | Germany . |
| WO 89/03318 | 4/1989 | WIPO . |

*Primary Examiner*—Khoi Q. Ta
*Attorney, Agent, or Firm*—Evenson, McKeown, Edwards & Lenahan, PLLC

[57] ABSTRACT

The invention concerns an automatic clutch in a motor vehicle drive train. During travel, the clutch is controlled with excess contact pressure such that the transmissible moment of the clutch exceeds the engine torque by a predetermined amount. At low speeds or in low gears and/or when travelling slowly, the amount of excess contact pressure is considerably reduced. At high speeds or in high gears and/or at when travelling fast, the clutch is set at the maximum transmissible moment.

4 Claims, 2 Drawing Sheets

AUTOMATIC CLUTCH

BACKGROUND AND SUMMARY OF THE INVENTION

The invention concerns an automatic clutch in the drive train of a motor vehicle, which has a transmission which is arranged between the engine and the drive wheels and can be shifted arbitrarily between gears or drive positions with different transmission ratios. A motorized adjusting unit actuates the clutch and is controlled by a system of sensors which senses the predetermined parameters. The system of sensors senses parameters correlated on the one hand with the torque of the engine and on the other hand with the transmissible moment of the clutch, and control the clutch with parameter-dependent excess contact pressure during driving.

In the case of motor vehicles with customary internal combustion engines, a transmission is required in the drive train to allow the transmission ratio between the speed of the vehicle engine and the speed of the drive wheels to be changed according to the respective travelling speed and loading of the vehicle. In the case of customary manually shifted transmissions, during a gear change or change of drive position, the power flow between the engine and the drive wheels has to be interrupted by releasing a clutch.

Automatic clutches are already standardly used for this purpose, i.e. the clutch is automatically released when changing gear or drive position and is subsequently re-engaged.

In addition, the clutch is also automatically controlled when starting the vehicle. If a drive position suitable for starting is selected, the clutch can, for example, be automatically engaged lightly in such a way that a very small torque adequate for making the vehicle begin to creep forward is transmitted. As soon as the engine power and the engine speed are increased by actuating a gas pedal or the like, the clutch is automatically engaged increasingly in order to increase the transmissible torque.

These known automatic clutches operate in the manner of friction clutches, the frictional engagement of which is controlled by the assigned adjusting unit of the clutch. In this case, the adjusting unit operates against a spring arrangement acting on the clutch so as to make it engage, i.e. the adjusting unit must generate varying degrees of counteracting force against the spring element if the frictional engagement or the transmissible moment of the clutch is to be reduced. When there is maximum frictional engagement or maximum transmissible moment of the clutch, the adjusting unit may be without any force at all. When the frictional engagement or the transmissible moment of the clutch is reduced, the adjusting unit must, furthermore, travel a varying distance. In the state of maximum frictional engagement or maximum transmissible moment of the clutch, the adjusting unit assumes an end position.

German Patent document DE-A 1 505 469 discloses an electromagnetically actuated clutch of the above-mentioned type.

The object of the invention is thus to present a particularly advantageous apparatus for controlling the automatic clutch.

This object is achieved according to the invention by the transmissible clutch moment exceeding the respective engine torque by a smaller amount in gears or drive positions with a high transmission ratio between the engine speed and the speed of the drive wheels and/or at low driving speed than in gears or drive positions with a lower transmission ratio and/or at higher driving speed.

The invention is based on the general idea of controlling the moment which can be transmitted by the clutch in a way analogous to the torque respectively generated by the engine and thereby operating with variable excess contact pressure of the clutch in adaptation to the respective operating conditions of the vehicle, i.e. the moment which can be transmitted by the clutch exceeds the torque respectively generated by the engine to a variable degree. It is envisaged here to decrease the excess contact pressure significantly when the risk or probability of shocks in the drive train—e.g. load cycle shocks—is particularly great, for example at low driving speed and/or when driving in low gears or drive positions with high transmission between the engine speed and the speed of the drive wheels. This, at the same time, takes into account the fact that in such driving situations gear changes or changes in drive position are performed comparatively frequently. On account of the low excess contact pressure, the adjusting unit can release the clutch particularly quickly, since a state with low excess contact pressure is synonymous with the adjusting unit being at a distance equivalent to varying travel from its end position, which is assumed when there is the maximum transmissible moment of the clutch.

If the transmission is shifted into a drive position or into a gear in which there is a low transmission ratio between the engine speed and the speed of the drive wheels, or in driving situations at high speed, the invention provides on the other hand that the excess contact pressure can be increased up to the maximum moment which can be transmitted by the clutch. In such operating phases, appreciable shocks in the drive train are unlikely. There is therefore no requirement to reduce the clutch moment or the frictional engagement of the clutch to a level at which the clutch, can for a short time, operate with slip, i.e. can slip, in the case of such shocks in order to absorb them. By setting the maximum transmissible moment or frictional engagement of the clutch, the adjusting unit is relieved in a desirable way, in particular the adjusting unit can be significantly saved in this way during long journeys on high speed roads.

Otherwise, with regard to preferred features of the invention, reference is made to the claims and the following explanation of the drawing, on the basis of which particularly preferred embodiments of the invention are described.

DETAILED DESCRIPTION OF THE DRAWINGS

Figure 1:
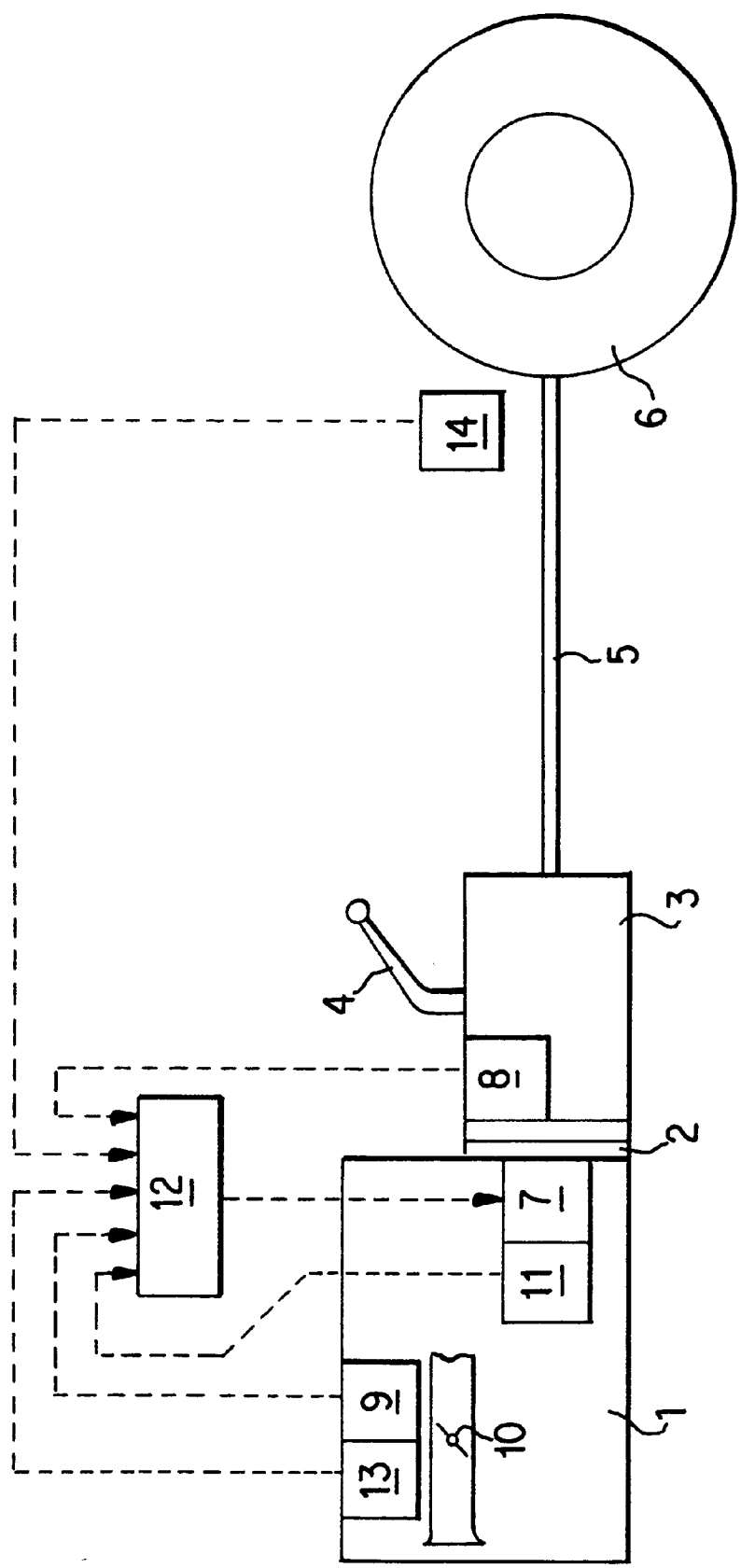
FIG. 1 shows a schematic representation of a drive train of a motor vehicle as well as the components essential for the clutch control according to the invention.

According to FIG. 1, an internal combustion engine 1 is connected in drive terms via an automatically actuated clutch 2 with a transmission 3. The drive positions or gears of the transmission are changed by manual actuation of a shift lever 4. The transmission is coupled with a drive shaft 5, for example a cardan shaft, to drive wheels 6 of a motor vehicle, otherwise not represented in any more detail.

The actuation of the clutch 2 takes place automatically via a motorized adjusting unit 7. For controlling the adjusting unit 7, a system of sensors is provided for monitoring various parameters of driving operation.

This system of sensors comprises a sensor arrangement 8, which is assigned to the transmission 3 or the shift lever 4 and senses the positions and movements of the latter, and consequently "knows" the respectively selected drive position or the respectively engaged gear. Alternatively, it may register when shifting is intended by the driver, involving leaving the respectively selected gear or the respectively selected drive position.

The position of an element actuated by the driver and serving for controlling the power of the engine 1, for example a throttle valve 10 of the air intake system of the engine 1, is registered by a sensor 9.

Furthermore, the system of sensors comprises a displacement pickup 11, which is assigned to the adjusting unit 7 and senses the position of the latter, and consequently a parameter which is analogous to the value of the moment which can be transmitted by the automatic clutch.

The control circuit 12 also communicates with an engine control 13, which has the task, among other things, of keeping the engine speed at a minimum speed, for instance the idling speed, to the greatest extent independently of the loading of the engine. This engine control 13 additionally generates signals which reproduce the respective speed of the engine 1 and or the torque respectively generated by the engine 1.

The control circuit 12 otherwise communicates with speed pickups 14, which are assigned to the drive wheels 6.

On the basis of the exchange of information with the engine control 13, the control circuit 12 can determine the moment actually transmitted in each case by the clutch 2. If the torque of the engine, determined by the engine control 13, is denoted by $M_M$, the moment of inertia of the engine 1, predetermined by the design of the engine 1, is denoted by $J_M$, and the changes in speed over time of the engine, reported by the engine control 13, are denoted by dw/dt, the following applies for the moment actually transmitted by the clutch $M_K$:

$$M_K = M_M - Jmd\omega/dt.$$

In addition, the control circuit 12 can establish on the basis of the signals of the engine control 13 for the engine speed and the signals of the speed pickups 14 whether the clutch 2 is operating with slip or "is slipping", i.e. whether the speeds on the input side and the output side of the clutch 2 deviate from one another. The speed on the input side of the clutch is definitively predetermined by the engine speed. The speed on the output side of the clutch is determined by the speeds of the drive wheels 6 together with the selected drive position or the selected gear of the transmission 3, i.e. together with the respective transmission ratio. The drive position or the gear and consequently the transmission ratio are reported by the sensor arrangement 8.

In the event that the clutch is operating with slip, i.e. is slipping, the respective position of the adjusting unit 7—this position is sensed by the displacement pickup 11—is assigned to the moment respectively transmitted by the clutch 2, since with a slipping clutch 2, or a clutch operating with slip, the moment actually transmitted in each case by the clutch 2 corresponds to the moment which can be transmitted in the respective position of the adjusting unit 7.

As a result, the control circuit 12 can thus constantly determine and store mutually assigned values between the travel of the adjusting unit and the moment which can be transmitted by the clutch 2, and can, if appropriate, extrapolate from this information the moment which can be transmitted by the clutch 2 for such positions of the adjusting unit 7 in which the clutch is operating without slip.

According to the invention, the control circuit 12 controls the adjusting unit 7 such that the clutch 2 operates with variable excess contact pressure during driving, i.e. the moment which can be transmitted by the clutch 2 exceeds the respective torque of the engine 1 by a predetermined amount, which according to the invention is controlled parameter-dependently.

If a low gear or a low drive position has been selected, i.e. there is a great transmission ratio between the speed of the engine 1 and the speed of the drive wheels 6, then the engine speed is thus comparatively great in relation to the wheel speed, and/or if the vehicle is travelling at low speed, which is sensed by the speed pickups 14, only small excess contact pressure is set. This has the consequence that the clutch 2 operates for a short time with slip when there are shocks in the drive train, for instance on account of a strong load cycle, and consequently has a shock-absorbing effect. At the same time, the setting of the clutch 2 takes into account the fact that in such operating situations a change of gears or drive positions is necessary comparatively frequently and the clutch has to be released correspondingly often. On account of the low excess contact pressure, the adjusting unit 7 need only travel a comparatively small additional releasing distance.

If a high drive position or a high gear has been selected and there is accordingly a low transmission between the engine speed and the wheel speed, and/or if the vehicle is travelling at high seed, according to the invention the vehicle can be driven with maximum excess contact pressure, i.e. the clutch 2 is set to maximum transmissible torque. This is synonymous with the adjusting force to be generated by the adjusting unit 7 and the travel to be covered by the adjusting unit 7 assuming diminishing values, i.e. the adjusting unit 7 assumes an end position in which it has no force, as described further below.

Consequently, the adjusting unit 7 can be significantly relieved during relatively long journeys on fast roads, i.e. if neither appreciable shocks occur in the drive train nor changes of gear or drive position are necessary.

Figure 2:
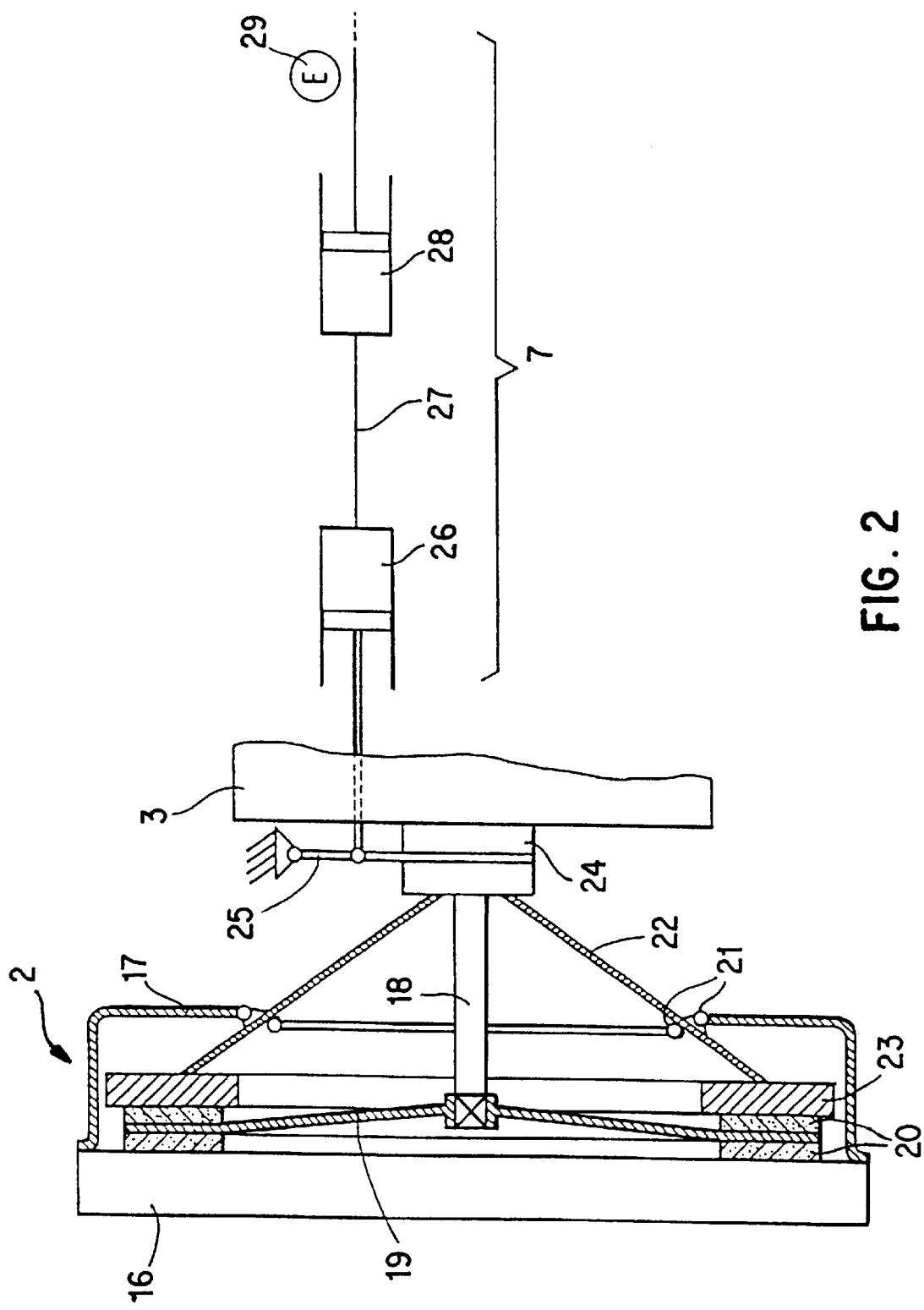
FIG. 2 shows a schematic representation of a hydraulically actuated clutch.

The engine 1 (not represented in FIG. 2 (cf. FIG. 1)) bears on an output part of its crankshaft a flywheel 16. The flywheel 16 is connected in a rotationally fixed manner to the crankshaft and is firmly connected to an essentially bell-shaped, annular clutch housing 17. Arranged coaxially with respect to the flywheel 16 is an input shaft 18 of the transmission 3. Connected in a rotationally fixed manner to this input shaft 18 is a driven plate 19 of the clutch 2. This driven plate 19 is designed to be axially compliant such that friction linings 20, which are arranged on the outer periphery of the driven plate 19, on the two faces of the latter, can be pressed axially against the flywheel 16. Secured on the clutch housing 17 via bearing rings 21 is a diaphragm spring 22, the concave side of which faces the flywheel 16. On the outer periphery, the diaphragm spring 22 bears an annular pressure plate 33, which completely covers the friction linings 20 of the driven plate 19 radially—seen in the axial view. On the inner periphery, the diaphragm spring 22 is rotatably supported on a release bearing 24, which is rotatably mounted in an axially displaceable manner on the input shaft 18.

The release bearing 24 is grasped by a release fork 25, which forms a lever which is movable about a pivot axis perpendicular to the axis of the input shaft 18. The release fork 25 is actuated by means of a hydraulic slave cylinder 26, which communicates via a hydraulic line 27 with a hydraulic master cylinder 28. The piston of the master cylinder 28 is displaceable in the example represented in the figure by an electric motor 29. This electric motor 29 forms, together with the slave cylinder 26, the hydraulic line 27 and the master cylinder 28, the adjusting unit 7 of FIG. 1 and is actuated by the control circuit 12 of FIG. 1.

The clutch 2 described above operates as follows:

The diaphragm spring 22 attempts to push the release bearing 24 to the right into an end position and to push the pressure plate 23 to the left in FIG. 2 such that the driven plate 19 with its friction linings 20 is clamped axially between the mutually facing faces of the flywheel 16 and the pressure plate 23. A very high adherence is achieved between the flywheel 16 and pressure plate 23 on the one hand and the driven plate 19 and the friction linings 20 on the other hand. If the release bearing 24 is displaced in the direction of the flywheel 16, in that the piston of the master cylinder 28 is pushed into the master cylinder 28 by means of the electric motor 29, then the aforementioned adherence is initially increasingly reduced. On further displacement of the release bearing 24 to the left, the driven plate 19 with its friction linings 20 is then released axially between the flywheel 16 and the pressure plate 23, i.e. the clutch 2 is completely released.

If the clutch is to be set to the maximum transmissible moment, the electric motor need merely be brought into a state in which it is free from self-locking, so that the diaphragm spring 22 can push the release bearing 24 back into the end position shown and assume its state in which it clamps the pressure plate 23 with maximum force against the driven plate 19 and the flywheel 16. If appropriate, it may be provided that the maximum clutch moment is set only after a certain delay time following the last gear change in each case, if the conditions mentioned above otherwise exist.

What is claimed is:

1. An automatic clutch in a drive train of a motor vehicle having a transmission which is arranged between an engine and drive wheels that is shifted arbitrarily between gears or drive positions with different transmission ratios, comprising:

a motorized adjusting unit which actuates the clutch;

a system of sensors which senses predetermined parameters, the system of sensors sensing parameters correlated on the one hand with a torque of the engine and on the other hand with a transmissible moment of the clutch, and controlling the clutch via the adjusting unit with parameter-dependent excess contact pressure during driving;

wherein the transmissible clutch moment exceeds the respective engine torque by a smaller amount when in at least one condition of a high transmission ratio between the engine speed and the speed of the drive wheels and a low driving speed than when in at least one condition of a lower transmission ratio and a higher driving speed.

2. The clutch as claimed in claim 1, wherein the clutch is settable to the maximum transmissible moment when in at least one condition of a low transmission ratio between the engine speed and the speed of the drive wheels and a higher driving speed.

3. The clutch as claimed in claim 2, wherein the maximum transmissible moment is settable only after a predetermined delay time following one of the last gear change or change of drive position.

4. A method of operating an automatic clutch in a drive train of a motor vehicle having a transmission arranged between an engine and drive wheels, the transmission being arbitrarily shiftable between gears, the method comprising the acts of:

sensing parameters correlated with a torque of the engine;

sensing further parameters correlated with a transmissible moment of the clutch;

controlling the clutch via an adjusting unit with a parameter-dependent excess contact pressure during driving;

reducing the amount of excess contact pressure in at least one condition of low speeds, low gears and travelling slowly; and setting the clutch at a maximum transmissible moment in at least one condition of high speeds, high gears and travelling fast.

* * * * *